UNITED STATES PATENT OFFICE.

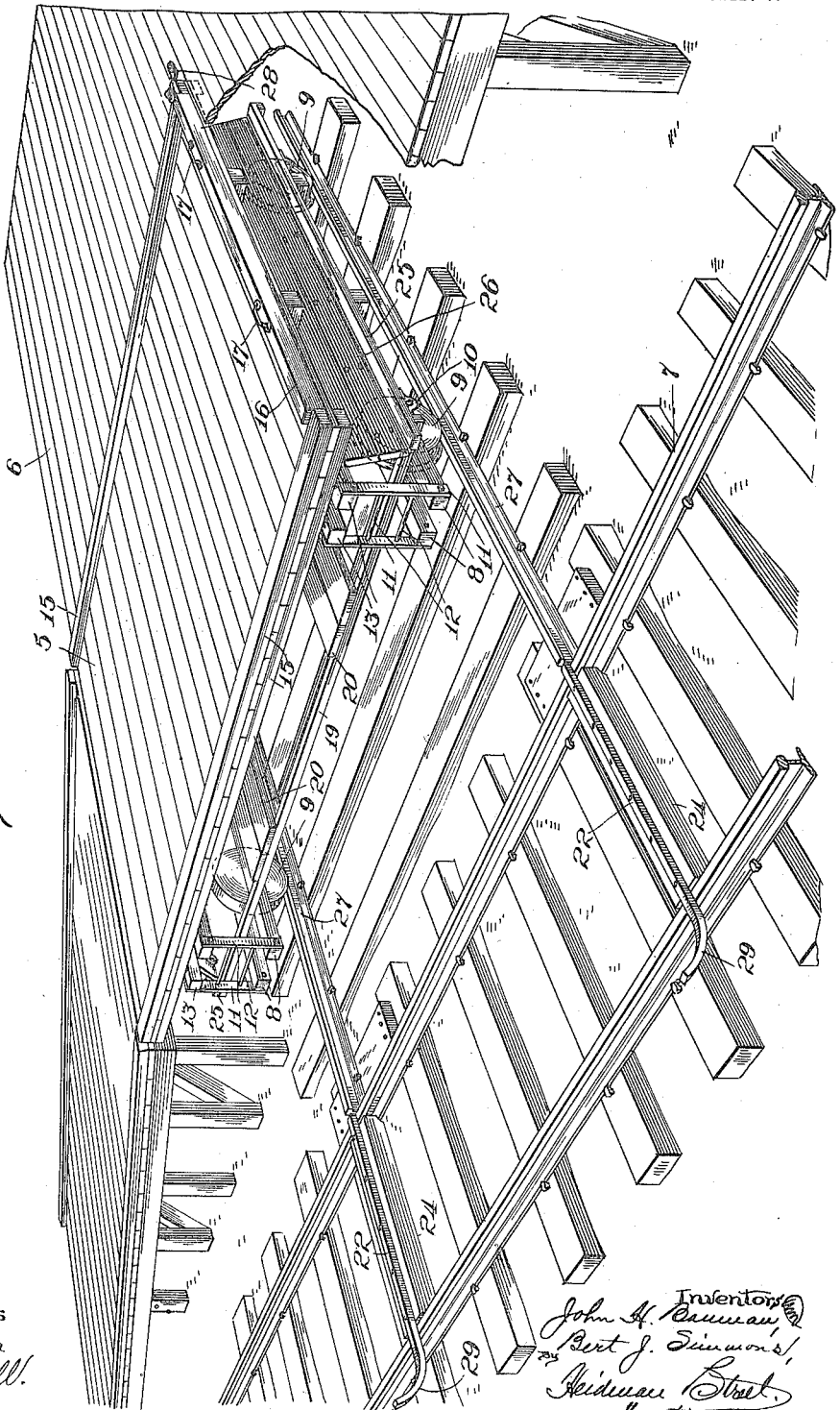

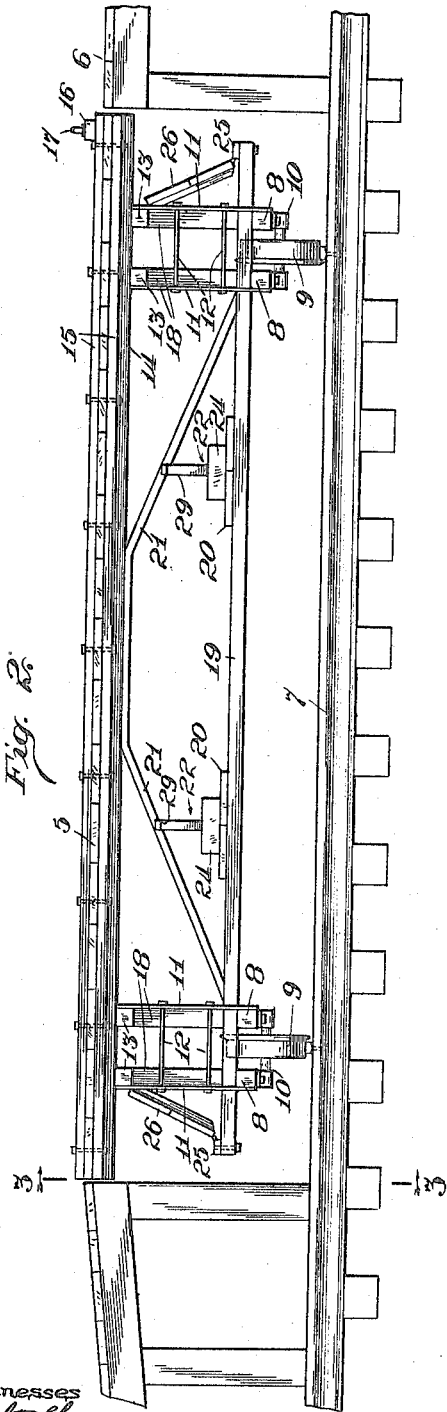
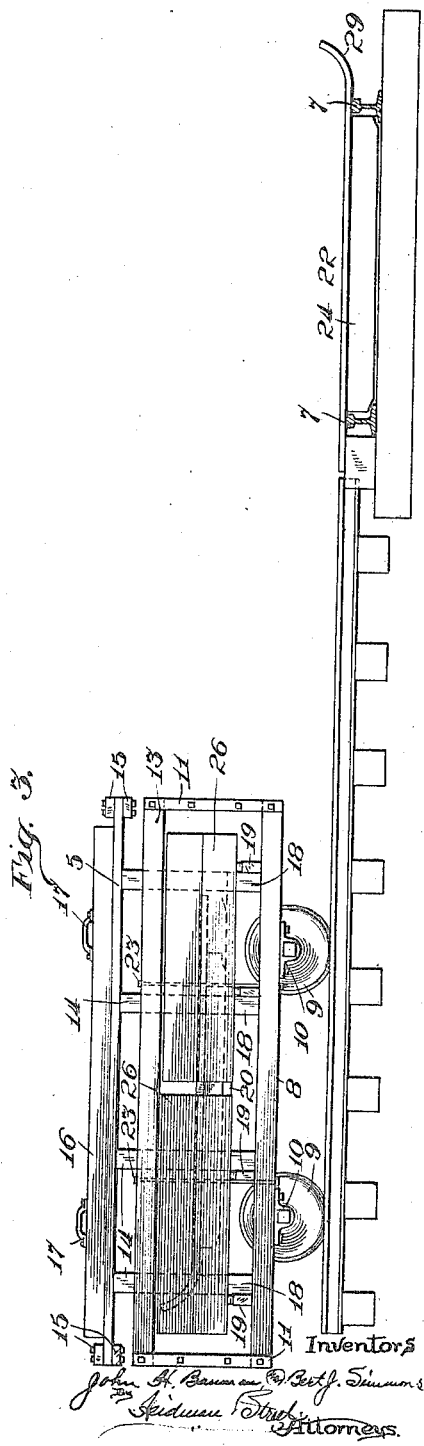

JOHN H. BAUMAN, OF SAN DIEGO, AND BERT J. SIMMONS, OF NEEDLES, CALIFORNIA.

CAR LOADING AND UNLOADING DEVICE.

1,248,995.  Specification of Letters Patent.  Patented Dec. 4, 1917.

Application filed March 6, 1917. Serial No. 152,464.

*To all whom it may concern:*

Be it known that we, JOHN H. BAUMAN and BERT J. SIMMONS, citizens of the United States, and residents of San Diego, in the county of San Diego, and of Needles, in the county of San Bernardino, respectively, in the State of California, have invented certain new and useful Improvements in Car Loading and Unloading Devices, of which the following is a description, reference being had to the accompanying drawings, which form a part of our specification.

Our invention relates to a device intended for loading and unloading freight and express cars, whether of the end door or of the side door type; the purpose being to provide a readily movable carrier, of a height substantially equal to that of the car threshold and the permanent yard or loading platform.

The device is more specially intended for loading and unloading bulky merchandise, such as automobiles, trucks, tractor engines, army wagons, and the like; the object of the invention being to provide a construction adapted for use in conjunction with the loading platform of the freight yards of a railroad.

The device is intended to be moved at right angles to the loading or yard tracks, so as to enable it to be brought into close relation with the designated or "spotted" car, whether the latter is on the track immediately adjacent to and parallel with the side of the loading platform; or on a track extending parallel with the loading platform but at a distance removed therefrom.

The invention contemplates a device which may easily be manually moved across the permanent yard tracks into proximity with the selected car; the device preferably being made of a height substantially the same as that of the platform it is intended to serve, so that the commodity may be readily moved from the device to the platform, or vice versa, and therefore also from the car onto the device, or from the latter into the car as the case may be.

The purposes of our invention, as well as the advantages inherent in the construction, will be more fully comprehended from the following detailed description of the accompanying drawings, wherein:—

Figure 1 is a perspective view of our improved device and portions of a loading platform as well as the tracks adjacent thereto; the device being illustrated as forming a part or section of the loading platform.

Fig. 2 is a side or front elevation of the device.

Fig. 3 is an end elevation, taken on the line 3—3 of Fig. 2 looking in the direction of the arrows; the figure also illustrating the sections of track, adapted to constitute cross-over tracks for the device, inserted in place between the permanent yard rails.

The device is more especially intended for use in railroad freight yards for the purpose of loading and unloading freight or express cars; the device permitting bulky commodities, such as automobiles, trucks, tractor engines, troop wagons, lumber, rails and the like, to be more readily loaded into or out of the cars and conveyed by the device either from or to the stationary loading platform of the yards. The device, therefore, is preferably made of a height corresponding with the height of the loading platform which, in turn, corresponds substantially with the height of the floor or threshold of the car above the ground.

Our improved device is more particularly adapted for use in loading and unloading end door box-cars, whether said cars are on the track immediately adjacent and parallel with the side of the loading platform or at a distance removed therefrom; the device being of such construction that it may be readily shifted or moved in proximity to the end of the car and permit the freight to be taken through the end door of the box-car and transported by the device to the permanent platform of the freight yard.

With the loading or yard tracks built parallel with the stationary freight platform, it has heretofore been inconvenient to load and unload end-door box-cars, and especially with commodities such as automobiles and the like, without employing other means, such as the ordinary large flat cars. This method of loading and unloading not only resulted in delay, but necessitated the additional expense incident to furnishing and switching flat cars onto the track having the car to be loaded or unloaded and into proximity therewith; whereas, with our improved device, the operations of loading and unloading may be immediately begun after the car has been "spotted" or properly located.

In the particular exemplification of the invention, the top or floor 5 of the device may be composed of wood or other suitable material, and is adapted to be substantially level with the floor 6 of the yard or permanent loading platform, which, as is usual, is built parallel with the yard tracks indicated at 7 in Fig. 1.

The device comprises suitable frame members 8, preferably arranged in pairs at opposite ends and transversely of the device; the members of each pair being spaced apart to receive suitable wheels 9 therebetween. The frame members 8 may be of wood or other suitable material, and are provided at proper points, with suitable hangers or journal-boxes 10 secured to the frame members 8 and adapted to receive the journals of the wheels 9.

The particular exemplification of the device shows it provided with two pairs of wheels, although it will be understood that three or more pairs may be provided commensurate with the size of the device. The longitudinal frame members 8 are secured at their ends to the vertically disposed frame members 11; the latter being also arranged in pairs, and preferably braced and held in proper spaced relation by suitable cross-members 12, which may also constitute the rungs of ladders whereby the freight handlers will be enabled to readily mount the device when it is desired.

The end underframes of the device also comprise the longitudinal members 13, also preferably arranged in pairs adapted to provide attaching means for the vertically disposed frame members and also provide support for the longitudinal sills 14 on which the floor 5 of the device is laid. The long sides of the device, to wit the ends of the flooring 5, are preferably provided with the cleat members 15, 15 arranged above and below the flooring, as clearly shown in Fig. 1, so as to prevent the possibility of warping; while one end of the device is shown provided with a guard rail 16, to constitute a suitable stop for the commodities loaded thereon, and assist in preventing the same from rolling off the device while being loaded thereon. The guard 16 may be provided with suitable handles 17, as shown.

The underframe also consists of a number of vertically disposed members or struts 18, extending between the transversely arranged members or sills 13 and the members 8, shown in full lines in Fig. 2 and in dotted lines in Fig. 3.

The underframe members 8 are shown provided with a suitable number of supporting members or supplemental sills 19 extending from end to end of the device; the purpose of these sills being to afford a support for the platforms 20, 20. The device may be further reinforced by suitable brace rods as indicated at 21 in Fig. 2, disposed between the longitudinal sills 14 and the transverse members 8. The platforms 20, 20 are adapted to provide a suitable storage and means for support for movable rail sections indicated at 22 in Fig. 3, which are intended to be used when the device is to be moved across the permanent yard tracks at the end of a car or be brought adjacent to the side of a car located on tracks at a distance removed from the yard or loading platform.

In order to further reinforce the underframe, we prefer to provide a suitable number of tie-rods 23, extending intermediate of and secured to the members 8 and 13 as shown in Fig. 3.

The movable rails may be of comparatively light construction and secured lengthwise of the ties or blocks 24, see Figs. 1 and 3; the blocks being of such length as to permit their insertion between the rails of a standard gage track; the ends of the movable rail sections being arranged to extend beyond their supporting blocks to adapt them to overlap the tread of the permanent yard rails, as very clearly shown in Figs. 1 and 3.

The supplemental sills or frame members 19 are preferably extended slightly beyond the underframe members, as shown in Figs. 1 and 2; being terminated, however, within the clearance of the platform or floor portion of the device. The extended ends of these members 19 are shown provided with the connecting strips 25, which provide support for and have hinged thereto, the running boards or steps 26. The running boards or steps 26 are so hinged to the frame members as to permit them to be swung upward against the vertically disposed members of the underframe and therefore beneath the top or floor of the device when the latter is not in use, and thereby permit the device to be moved into close relation with the permanent or yard platform, as shown in Figs. 1 and 2.

The device normally remains or rests on the short permanent tracks shown at 27 and arranged at right angles to the main or yard tracks 7; the rails 27 being spaced apart a distance commensurate with the length of the device, which may vary and be of any suitable size to meet the general requirements of the railroad where the device is installed.

When not in use, the device is moved to the end of the permanent platform, or into a suitable recess formed in the platform as shown in Fig. 1 for example, and may be locked in place by means of a suitable hasp, as shown at 28, in Fig. 1. The rails 27, at least at the ends adjacent to the rails of the permanent yard truck 7, are elevated sufficiently so as to enable the device to be moved across the permanent rails and onto the movable rail sections placed between the permanent rails, thus permitting the device to be moved across the immediate permanent track or onto the track adjacent and therefore also against the end of the car to be loaded or unloaded. In order to prevent the device moving too far or rolling off of the movable rail sections, the rails of the movable sections are preferably curved upward at the outer or farthest removed end, relative to the direction of movement of the device, as clearly shown at 29 in Fig. 1, thus preventing the device being shifted too far or rolling off onto the ground. Where it is intended to serve a number of unloading tracks, permanent rails in sections may be provided for the device to roll on; these rail-sections being laid between the rails of the permanent tracks and proper space being provided between the ends of these rail-sections to allow proper operation of trains over the unloading or yard tracks. Where this arrangement is employed, the ground should preferably be filled in flush with the top of the rail upon which the device rolls so as to obviate any objection from the standpoint of safety.

In the use of our device, when the car to be unloaded has been "spotted" and it is of the end-door type, the device is unlocked, the movable rail-sections are put into place, when the device may be pushed out along its rails and brought into close relation with the end door of the car. It is evident that the device is adapted to serve either type of car, namely the side-door type as well as the end-door type; with the side-door type car, however, if the latter is on the track adjacent the permanent platform, then the movable rail-sections will not be necessary, as the device may be moved along the rails 27 and be brought against the side of the car. After the commodity has been removed from the car onto the device, the latter is then pushed back into its recess or intimate relation with the stationary loading or yard platform, where the commodity may be rolled or pushed off onto the main platform.

When two or more cars are to be unloaded, one car can be "spotted" on each side of the device, and while one car is being unloaded the other may be prepared for unloading and thus enable an additional saving of time. It is evident that this condition may be extended in a similar manner over any number of tracks it is desired to operate over.

By the use of our improved device, the delays and expense heretofore encountered and resulting from the switching about of flat cars for use in unloading bulky freight, are entirely eliminated; thus also obviating the necessity of keeping flat cars out of commercial service, as is the case where the present method of freight handling is employed.

Furthermore, our device also obviates the necessity of a box or automobile car, which is provided with but one end door, having to be turned end for end so as to facilitate its unloading, as a mere positioning of the car relative to the device is all that is required, namely by moving the car along the permanent track so as to bring the door-end toward the device.

We have shown and described what we believe to be the simplest and best form of the invention, but the construction may be varied in certain details without, however, departing from the spirit of our invention.

What we claim is:—

1. A device of the class described, having a flat top or floor, an underframe composed of members arranged in pairs and extending transversely of the ends of the device, wheels journaled between the members of each pair, and running-boards hinged to the underframe at the ends of the device so as to swing upwardly beneath the floor and within the clearance of the top.

2. In a device of the class described, the combination of a permanent loading yard platform, with a detached section provided with an underframe composed of transversely disposed members arranged in pairs and in spaced relation with one another, some of said transversely disposed members being provided with bearings, wheels mounted in said bearings and between the correlated members of the transversely disposed members, vertically disposed members arranged between certain of the transversely disposed members at opposite ends of the platform section, and means intermediate of the vertically disposed members located at the same side of the platform section for maintaining some of the vertically disposed members in spaced relation and adapted to constitute the rungs of a ladder.

3. A device of the class described, comprising a top or main floor, an underframe composed of vertically disposed struts, members arranged in pairs transversely beneath the top at opposite ends of the struts, the pairs at the lower ends being provided with journal-bearings, wheels arranged between said pairs of members on journals mounted in said bearings, longitudinal sills mounted on the lower pairs of transversely disposed members at opposite ends of the device, and a supplemental platform arranged on said longitudinal sills.

4. A device of the class described, comprising a main flat top, frame-members disposed transversely beneath the top at opposite ends thereof, running-gear secured to said frame-members, a supplemental lower platform supported by the frame-members at opposite ends of the device, and running-boards hinged to the frame-members at opposite ends of the device, adapted to fold upwardly beneath the main top.

5. A device of the class described, comprising a main flat top, means secured to the sides of the top adapted to prevent warping thereof, frame-members disposed transversely beneath the top at opposite ends thereof and arranged in pairs, some of said members being provided with journal bearings, wheels journaled in said bearings and intermediate of the members of two pairs of said frame-members, longitudinally disposed sills mounted beneath the top on frame-members at opposite ends of the device to support a supplemental platform, the ends of said longitudinally disposed sills being extended beyond the vertical planes of the first-mentioned frame-members, and running boards hinged to the extended ends of said longitudinally disposed sills.

6. In a device of the class described, the combination of a permanent loading platform provided with a detached section, said section being provided with running gear at opposite ends thereof adapted to move along tracks disposed at right angles to the permanent loading platform and to the permanent yard tracks, the top of said platform-section being arranged flush with the top of the permanent yard platform, with movable rail-sections comprising supporting blocks adapted to be inserted between the rails of the permanent yard-tracks and rail-sections secured on said blocks with extending ends adapted to overlap the tread of the permanent yard rails so as to permit the detached platform-section to be moved across the permanent tracks into juxtaposition with the loading doors of a car.

JOHN H. BAUMAN.
BERT J. SIMMONS.

Witnesses:
A. G. BAUMAN,
A. W. SILVER,
F. KLOSTERMAN.

Copies of this patent may be obtained for five cents each, by addressing the "Commissioner of Patents, Washington, D. C."